Aug. 17, 1943.   R. E. SPRAGUE ET AL   2,326,896
MANUFACTURE OF INSULATING MATERIAL
Filed July 15, 1942
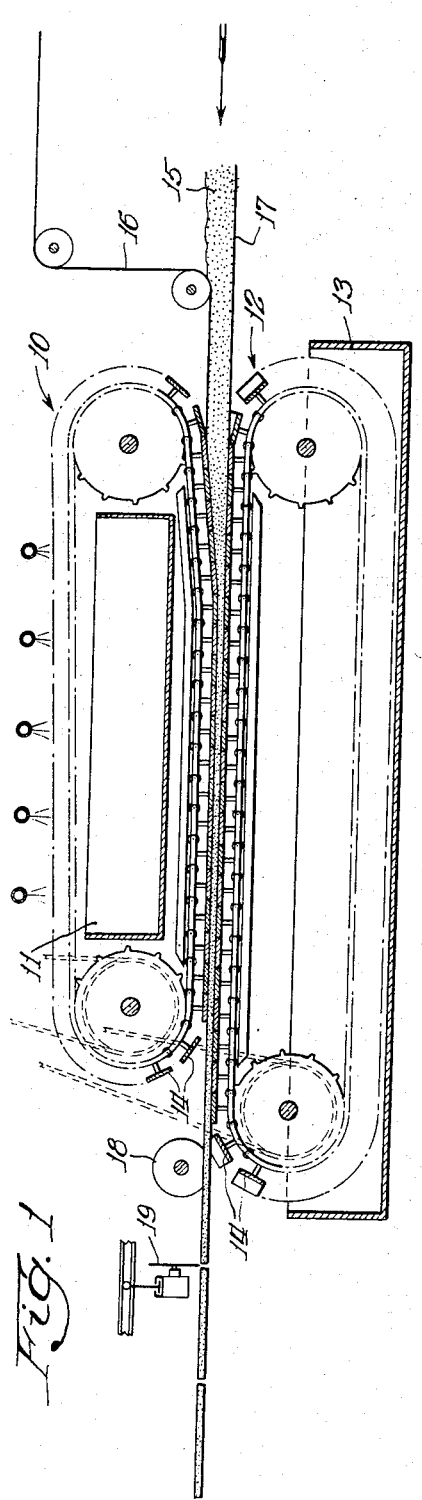
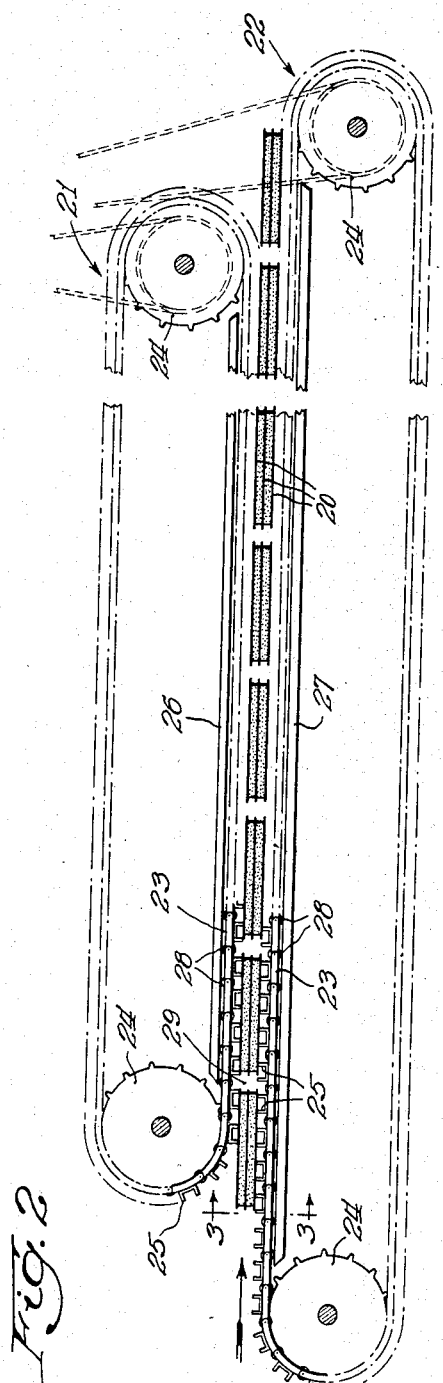
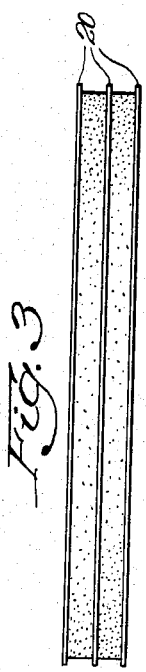
Inventors:
Roy E. Sprague and
Howard M. Sprague
By Roland C. Achu
Atty.

Patented Aug. 17, 1943

2,326,896

UNITED STATES PATENT OFFICE 2,326,896

MANUFACTURE OF INSULATING MATERIAL

Roy E. Sprague and Howard M. Sprague, Joliet, Ill.

Application July 15, 1942, Serial No. 450,994

6 Claims. (Cl. 18—47.5)

This invention relates to the manufacture of insulating material, and among other objects aims by practicable means to increase the production of such material.

The nature of the invention may be readily understood by reference to one embodiment thereof illustrated in the accompanying drawing.

To permit illustration on a large scale on said drawing the diagram illustrating the inventive method is shown in two parts, the first, Fig. 1, comprising a longitudinal elevation, partly in section of the primary conveyor in which the primary cooling takes place; and the second, Fig. 2, comprising a similar longitudinal elevation of the secondary conveyor wherein the secondary cooling takes place. Fig. 3 is a transverse section taken on the plane 3—3 of Fig. 2 showing superposed slabs as they pass through the secondary conveyor.

The illustrative material comprises board, slabs or other molded forms of exfoliated vermiculite granules bonded with a thermo-plastic binder such as asphalt and preferably faced with fibrous sheets such as heavy paper. The details of such material and one method of manufacture thereof are disclosed in co-pending Denning application Serial 365,375, patented July 7, 1942, No. 2,289,250. For convenience we shall refer to the binder as asphalt with the understanding that it represents a thermo-plastic binder.

Difficulty has been experienced in securing adequate production of such insulating material by practicable and economical means. As explained in said Denning application, the mass of springy asphalt-coated vermiculite granules is compressed into adequate bonding contact and held in such compressed condition until the asphalt is cooled sufficiently to set or harden, thereby to hold the granules firmly bonded together. The small amount of asphalt used (a greater amount cannot be used without reduction of insulating efficiency and prohibitive increase in weight) cannot function as a bonding material unless the granules be pressed into substantial contact with each other and so held until the asphalt has hardened sufficiently in such bonding contact. Because the exfoliated vermiculite is an efficient insulating material, it is very difficult to abstract sufficient heat from the interior of the mass to cool or set the bonding asphalt. For this reason it has been necessary to run the conveyor on which the material cooled under compression very slowly, resulting in very low production.

We have found that heat is abstracted from the material mainly through the faces in contact with the thick metal surfaces of the upper and lower conveyors, rather than through radiation to the atmosphere. Even with equal surface exposure the metal would abstract more heat than air. However, because of the insulating efficiency of the vermiculite, the heat travels very slowly from the interior of the material to the surface. The surface layers adjacent the cool metal are quickly cooled, even to a temperature much lower than that necessary to set the asphalt and complete the bond; but the interior cools so slowly that production has heretofore been greatly retarded.

According to the present method, production is increased by utilizing the surplus low temperature of the surface layers to cool the interior of the material at a later stage in the process. In the present instance the surface layers of the material are initially cooled and then slabs or sections of the material are superposed, and while superposed and under compression, heat on the interior of the slabs is abstracted by means of the cool surface layers. While the latter, of course, absorb heat in cooling the interior of the material they are not heated to the point where the bond between the granules is broken or impaired, and in the meanwhile the interior of the material is cooled and the asphalt set so as permanently to bond the interior granules while compressed together in bonding contact.

During the cooling of the surface layers the speed of travel (and therefore the production of the material) may be greatly increased since much less than half the total cooling time is required for surface layer cooling. Subsequent cooling of the interior can consume a substantially longer time without reducing production since it is not necessary substantially to reduce the total heat content of the slabs. The slabs, therefore, may be stacked one on the other to a sufficient degree in the subsequent cooling stage to accommodate the increased production. Of course, cooling by radiation and otherwise continues but reduction of the heat content of the slabs is not solely relied on for setting the asphalt on the interior; this is accomplished in large measure simply by equalization within the slabs, the interior being cooled by the adjacent sub-cooled surface layers.

In the present method two sets of conveyors are preferably employed. The initial conveyor (similar to that shown in said Denning application) on which the initial or surface layer cooling takes place may travel at double its former speed. The second conveyor on which the slabs are superposed, one on the other, may travel more slowly, e. g., about half the speed of the first conveyor if the slabs are stacked two deep, and about a third of the speed if stacked three deep, and so on. Preferably the second conveyor travels in a direction the reverse of that of the first conveyor to economize space, otherwise a long and uneconomical building would be necessary. The second conveyor may be light in weight since thick metal surfaces are not required for cooling purposes. During travel on the second conveyor the material is of course maintained compressed to hold the granules in thorough bonding contact until the asphalt has set to maintain the bond.

The drawing illustrates one form of apparatus for performing the above described method. The conveyor shown in Fig. 1 in which the primary or surface layer cooling takes place may be of the same general type as that illustrated in detail in said co-pending Denning application. In the present instance cooling is effected not by surrounding with a chilled atmosphere but by applying cooling water to the conveyor surfaces. Other means of cooling may be employed. As here shown the upper conveyor 10 is cooled by a water spray which is caught in a drain pan 11 lying underneath the upper flight of the conveyor. The lower conveyor 12 is cooled by causing the return or lower flight to pass through cooling water contained in the tank 13. Thus the metal plates 14 comprising the conveyor faces are cooled and in turn cool the upper and lower surface layers of the material to a point substantially below that necessary to set the asphalt. During such cooling the material is compressed so as to bring the granules of vermiculite into adequate bonding contact.

The details of the conveyor are fully disclosed in said Denning application and since they are not necessary to an understanding of the present invention, description thereof will not be repeated here.

Description of the preliminary steps of the process are also not repeated. It will be understood that prior to delivery to the cooling apparatus the granules of exfoliated vermiculite are mixed with a relatively small amount of molten asphalt of high melting point, that is, asphalt which is hard or sets at ordinary temperatures. The granules are relatively much cooler than the molten asphalt and congeal a thin film of asphalt thereon which serves both to prevent penetration of asphalt into the granules and later as the means for bonding the granules together. It is important that the granules be compressed into substantial bonding contact and held in this condition until the asphalt has set or hardened sufficiently to maintain the bond. The amount of asphalt used is too small otherwise to bond the granules adequately. A greater amount of asphalt would objectionably increase the weight of the material and would substantially reduce its K factor (insulating efficiency).

The coated granules are spread in a layer 15 (substantially thicker than the final slab) between upper and lower facing sheets 16 and 17 and in this condition enter the primary cooling and compression stage. To bring the granules into extensive bonding contact, the material is compressed in this case to a final thickness of about 1½ inches.

After issuing from the surface layer cooling stage the web of material is trimmed and cut by slitters 18 and 19 to produce slabs of size convenient for handling. In the present case these slabs are about 16 by 32 inches. The nature of the trimming and slitting mechanism is not pertinent here. Further description thereof is found in said Denning application.

According to the present process the material is passed through the first or surface layer cooling stage at a very much higher rate than in the process disclosed in said Denning application. Only the surface layers are cooled. These may be cooled quickly because they are close to the cool conveyor surfaces and because the cooling rate is not a linear function of the distance which the heat must travel. For example, the time necessary to cool the outside ⅜ inch layer of material is considerable less than one-half the time which would be required to cool the two inner ⅜ inch layers. It was the cooling of the interior layers of the material which was responsible for retarding the rate of production. Therefore as the slabs are trimmed and cut only the surface layers have been cooled, and those substantially below the setting point of the asphalt. The interior of the slabs are still quite warm and are relatively soft or flexible and the slabs are preferably handled by being placed on pallets 20 so as not to disturb the bonded surface layers.

To complete the cooling and bonding of the interior of the slabs they are superposed one on the other, preferably with an intervening pallet 20 as illustrated in Fig. 3, and in such superposed relation are passed through the secondary cooling stage represented by the conveyor Fig. 2. This conveyor advantageously comprises upper and lower conveyor flights 21 and 22 in which the lower flight preferably projects at each end beyond the ends of the upper flight to facilitate delivery and removal of the material. In the present case the secondary conveyor travels in the reverse direction to economize space and avoid the necessity of a long building. Any appropriate mechanical or manual means may be employed for transferring the slabs from the primary conveyor and superposing them for entry into the secondary conveyor.

The secondary conveyor flights may be much lighter in weight than the primary conveyor. In the present case they comprise pairs of conveyor chains 23 traveling around sprockets 24 and carrying transverse conveyor elements in the form of channels 25. The latter are welded or otherwise secured to links of the conveyor chains with their flanges outermost, thus providing air passages adjacent the upper and lower pallets 20. The latter serve both to prevent marring of the surfaces of the slabs by the conveyor elements and for supplemental cooling. The slabs are maintained in compression by passing the conveyor chains between upper and lower pairs of rails 26 and 27 on which the rollers 28 of the conveyor chains roll. One or both rails 26 and 27 are vertically movable by any appropriate means such as that disclosed in said Denning application, to adjust the compression on the slabs.

The secondary conveyor travels at a much slower speed than the primary conveyor. If the slabs be superposed in two thicknesses it need travel only slightly more than half as fast as the primary conveyor. This will provide spaces 29 between adjacent stacks of slabs. The secondary conveyor may advantageously be made longer than the primary conveyor without increasing building length since the apparatus preceding the primary conveyor is itself of substantial length.

As stated above, the cooling which takes place in the secondary conveyor is in the nature of equalization of heat, the interior layers of the slabs being cooled by the sub-cooled surface layers. Of course, there is transfer of heat not only to the surrounding atmosphere but to the pallets 20 (which may be either of wood or of metal), but transfer of heat to the exterior is not solely relied on to cool the interior of the slabs. In this connection it should be understood that the bonding asphalt used is of such character as to set at about 137° F. and it is thus possible for the cooled surface layers of the material to absorb a substantial amount of heat from the interior without being heated to a point where the bond in the surface layers is impaired.

During transfer of the slabs from the primary to the secondary conveyor, the inter-granule bond within the interior layers of the slabs may be momentarily broken through expansion of the vermiculite after the pressure is relieved. However, bonding contact is restored on the interior of the slabs by the compression exerted in the secondary conveyor and this compression is maintained until completion of cooling of the asphalt within the slabs. Thereupon the slabs are delivered from the secondary conveyor in completely bonded condition.

By means of the foregoing process the speed of production may easily be doubled without the use of a prohibitively long conveyor or other substantial alteration of the primary apparatus.

Obviously the invention is not limited to the details of the illustrative method since these may be variously modified. Moreover, it is not indispensable that all features of the invention be used conjointly since various features may be used to advantage in different combinations and subcombinations.

Having described our invention we claim:

1. The method of making molded insulating material from an insulating aggregate bonded by a thermo-plastic binder which comprises applying a primary cooling medium to a layer of the material in heated condition while under compression, advancing the said layer through the primary cooling stage at a rate too fast to permit complete cooling but which allows sufficient time to cool only the surface layers of the material and cooling such layers substantially below the temperature necessary to set the binder, then cutting the layer into sections and superposing the sections, applying pressure thereto and advancing the sections at a slower rate while the interior of the material is cooled partly through the action of the sub-cooled surface layers.

2. The method of making molded insulating material from an insulating aggregate bonded by a thermo-plastic binder which comprises advancing a layer of the material in heated condition between upper and lower initial cooling surfaces at a rate sufficient to cool only the surface layers of the material and too fast to permit complete cooling, then superposing the material in two or more layers and advancing the same at a slower rate while the said cooled surface layers abstract heat from the interior of the material.

3. The method of making molded insulating material from an insulating aggregate bonded by a thermo-plastic binder which comprises advancing a layer of the material in heated condition and under compression between upper and lower initial cooling surfaces at a rate sufficient to cool only the surface layers of the material and too fast to permit complete cooling, then superposing the material in two or more layers and advancing the same under compression at a slower rate while the said cooled surface layers abstract heat from the interior of the material to set the thermo-plastic binder.

4. The method of making molded insulating material from an insulating aggregate bonded by a thermo-plastic binder which comprises advancing a layer of the material in heated condition and under compression between upper and lower initial cooling surfaces at a rate sufficient to cool only the surface layers of the material and too fast to permit complete cooling, cutting the material into slabs, superposing two or more slabs on each other as they are delivered from the initial cooling stage, and advancing the superposed slabs under compression at a slower rate while cooling the interior of the slabs until the thermo-plastic material has set throughout the slabs.

5. The method of bonding an insulating aggregate with a thermo-plastic binder which comprises advancing a layer of the aggregate with the binder in heated condition between upper and lower cooling surfaces, applying pressure to maintain the aggregate in bonding contact and cooling the surface layers of the material but not its interior to temperatures substantially below the setting point of the binder, then cutting the layer into sections and superposing the same in two or more layers and applying pressure thereto while the interior of the material cools to set the binder in the interior.

6. The method of making insulating material from a resilient insulating aggregate bonded with a thermo-plastic binder which comprises compressing a continuous layer of the aggregate coated with the binder between cooling surfaces, advancing the layer at such a rate that only the surface layers and not the interior layers of the material are cooled, cutting the layer into sections and superposing two or more sections between supporting pallets, compressing the superposed sections and simultaneously advancing the same at a slower rate while the interior of said sections cools.

ROY E. SPRAGUE.
HOWARD M. SPRAGUE.